March 30, 1948.  E. B. SUTHERLAND  2,438,724
TIME CYCLE CONTROLLER
Filed June 26, 1945  11 Sheets-Sheet 1

INVENTOR.
EUGENE B. SUTHERLAND
BY
Beau, Brooks, Buckley & Beau.

March 30, 1948.  E. B. SUTHERLAND  2,438,724
TIME CYCLE CONTROLLER
Filed June 26, 1945  11 Sheets-Sheet 2

INVENTOR.
EUGENE B. SUTHERLAND
BY Bean, Brooks, Buckley & Bean.

March 30, 1948.  E. B. SUTHERLAND  2,438,724
TIME CYCLE CONTROLLER
Filed June 26, 1945  11 Sheets-Sheet 3

INVENTOR.
Eugene B. Sutherland
BY Beau, Brooks, Buckley & Beau.

March 30, 1948.   E. B. SUTHERLAND   2,438,724
TIME CYCLE CONTROLLER
Filed June 26, 1945   11 Sheets-Sheet 6

INVENTOR.
EUGENE B. SUTHERLAND
BY
Bean, Brooks, Buckley & Bean.

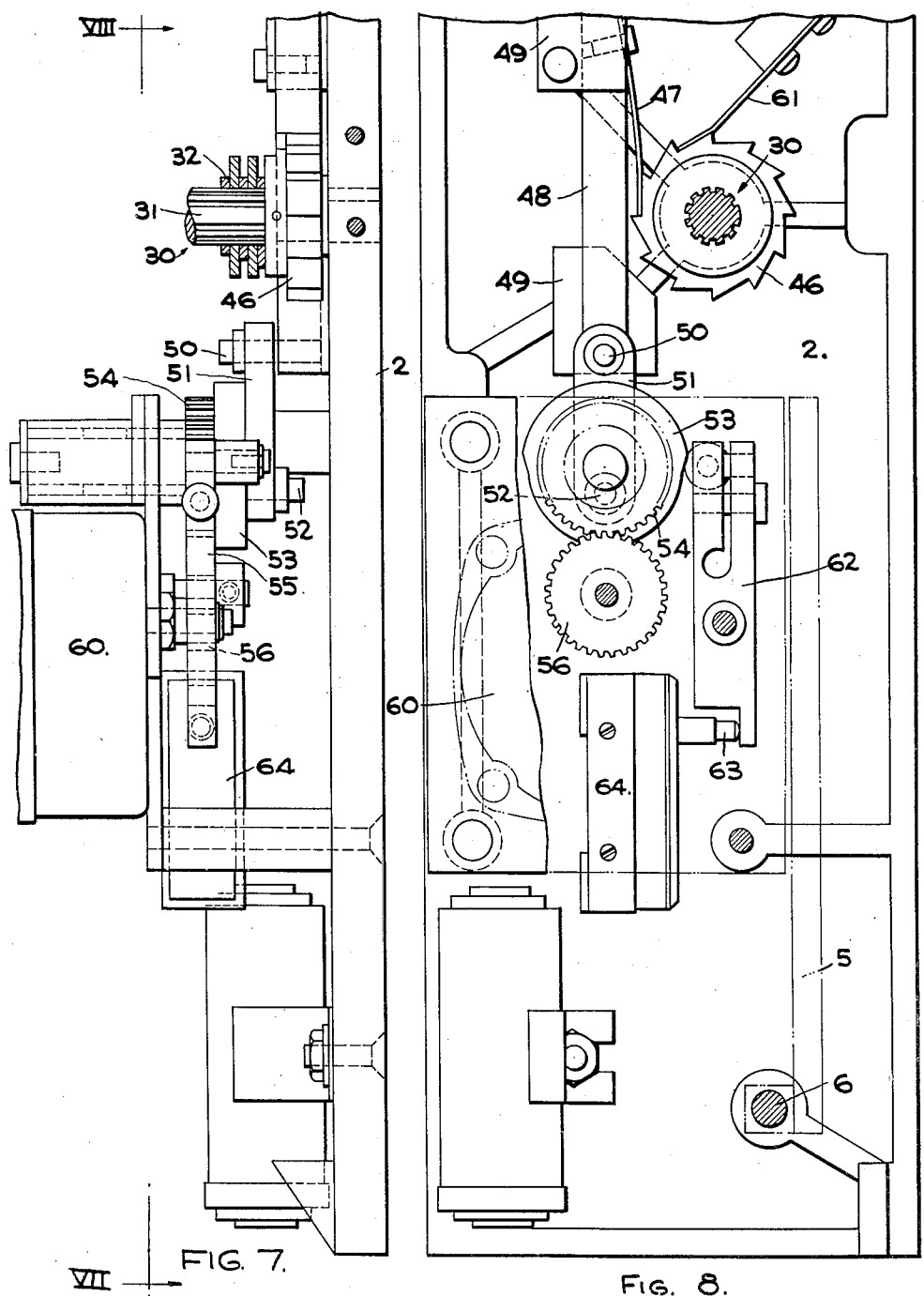

March 30, 1948. E. B. SUTHERLAND 2,438,724
TIME CYCLE CONTROLLER
Filed June 26, 1945 11 Sheets-Sheet 8
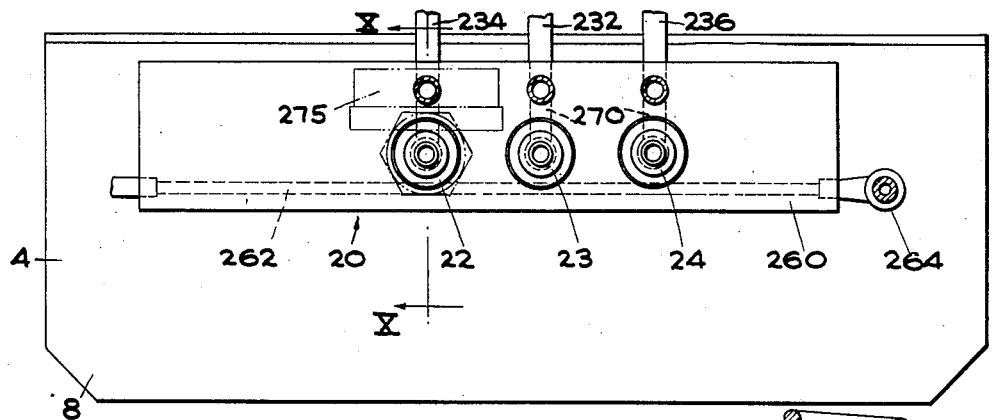
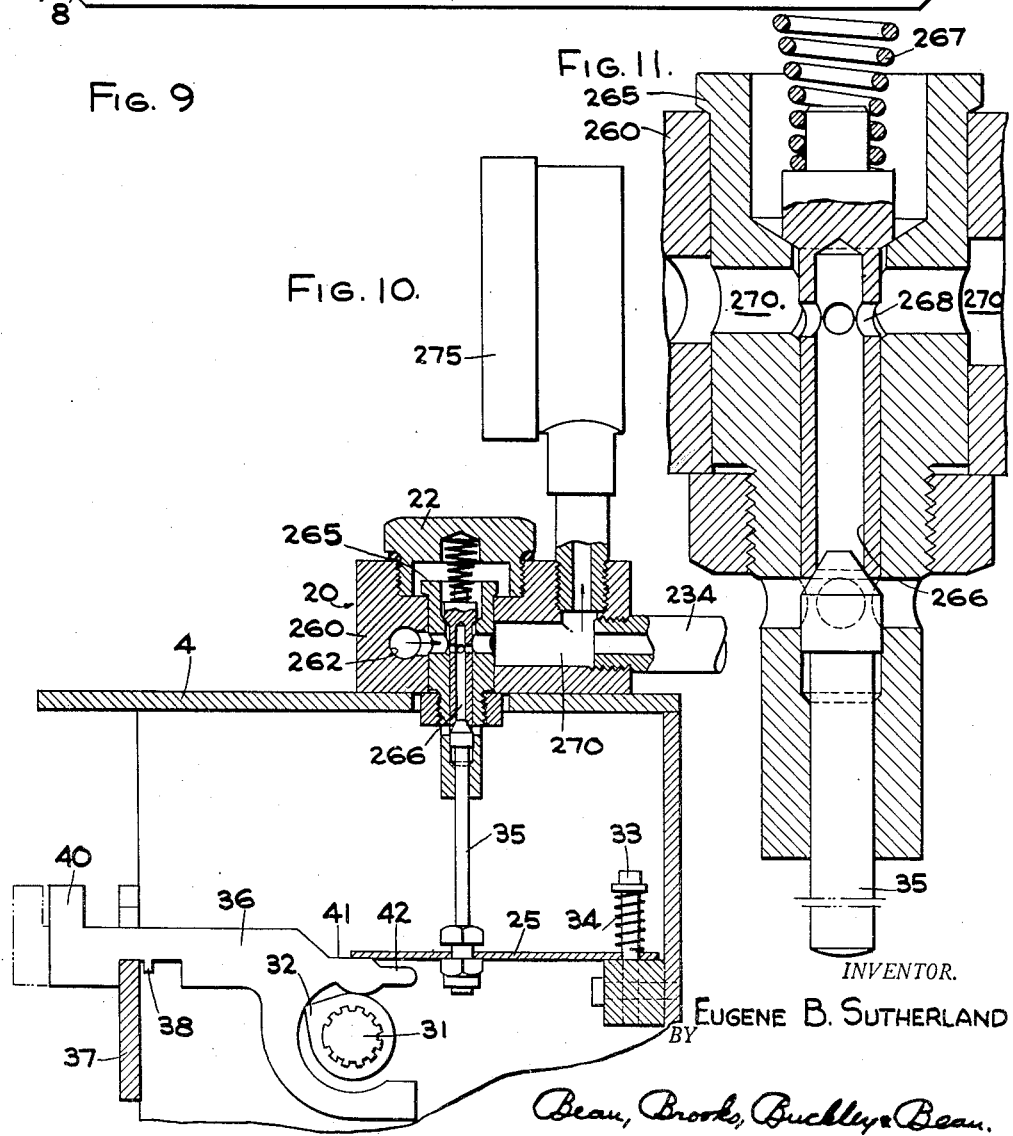
INVENTOR.
EUGENE B. SUTHERLAND
BY Bean, Brooks, Buckley & Bean.

March 30, 1948.　　E. B. SUTHERLAND　　2,438,724
TIME CYCLE CONTROLLER
Filed June 26, 1945　　11 Sheets-Sheet 9
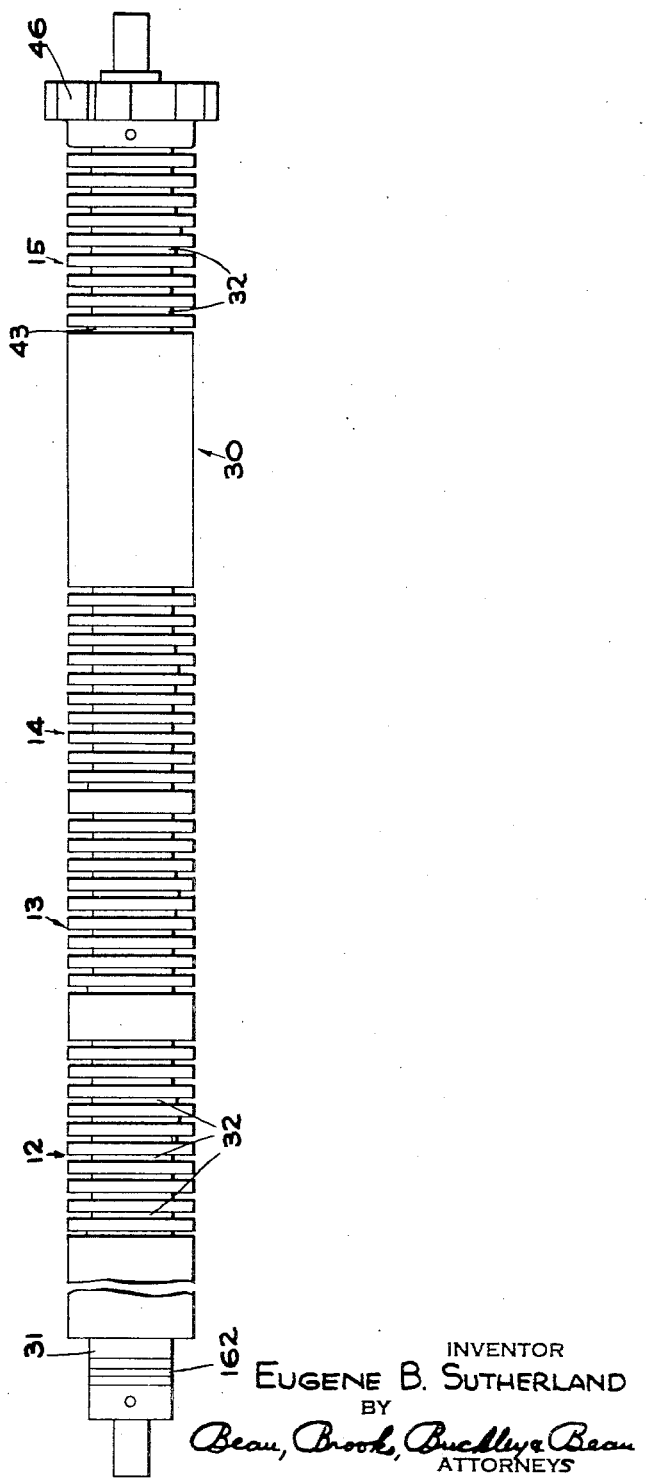

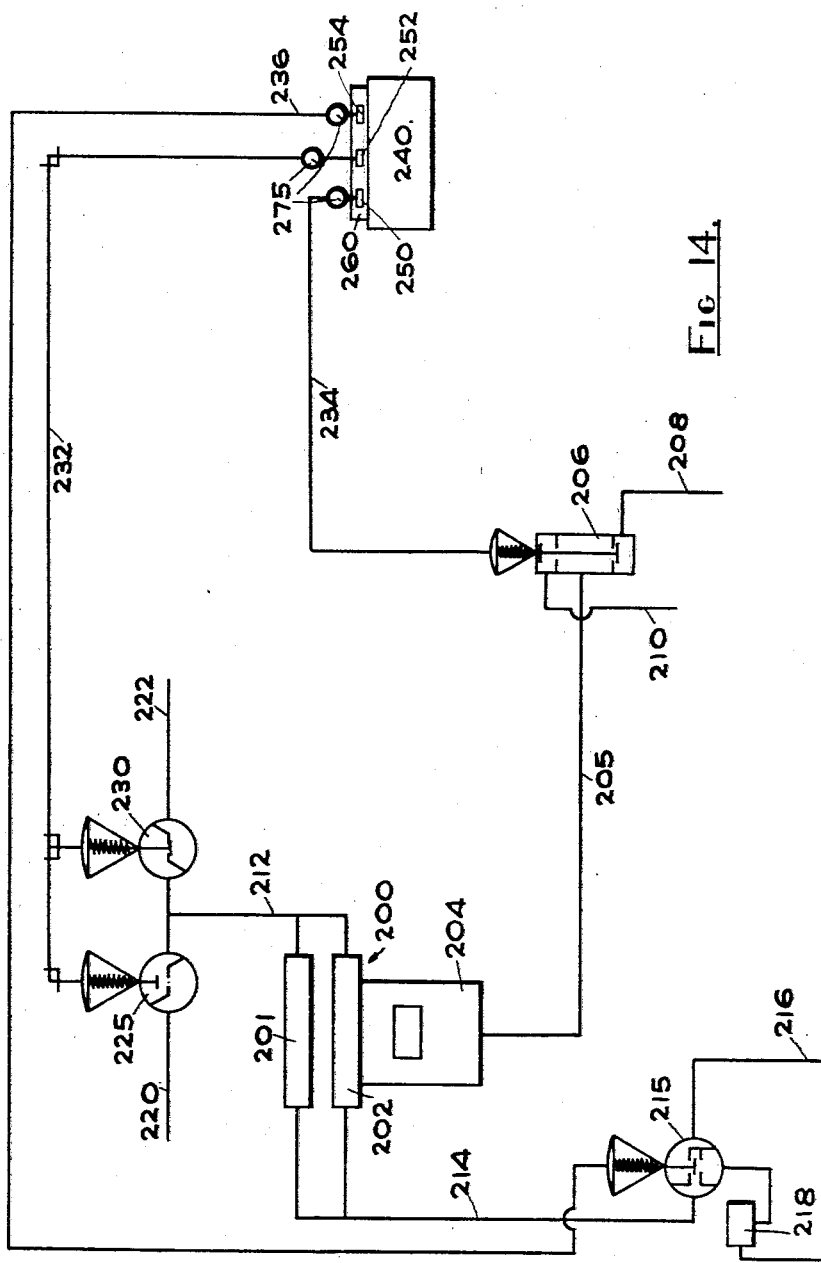

Patented Mar. 30, 1948

2,438,724

UNITED STATES PATENT OFFICE 2,438,724

TIME CYCLE CONTROLLER

Eugene B. Sutherland, Akron, Ohio, assignor to Seely Instrument Co., Inc., Akron, Ohio Application June 26, 1945, Serial No. 601,579

13 Claims. (Cl. 192—139)

This invention relates to automatic controllers, and more particularly to an improved adjustable-cycle controller such as is adapted to automatically govern operations of a plurality of mechanisms in predetermined sequences of operation.

It is a primary object of the present invention to provide an improved cycle controller that is universally applicable in improved manner to automatic control of pluralities of mechanisms requiring operational coordination in accord with adjustable sequence and time interval programs. Other more specific objects and advantages of the invention will appear in the specification hereinafter.

In the drawing:

Fig. 7 is a fragmentary front elevation of the cam shaft indexing mechanism which is carried upon the right hand end wall of the controller casing as viewed in Fig. 1;

Fig. 8 is a section along line VIII—VIII of Fig. 7;

Fig. 9 is a top plan of the mechanism of Fig. 1;

Fig 10 is a fragmentary section, on an enlarged scale, along line X—X of Fig. 9;

Fig. 11 is an enlarged view of a detail of Fig. 10;

Fig. 12 is a disassembled view of a typical cam shaft portion of the index control mechanism of the invention;

Fig. 14 is a diagrammatic illustration of a typical operative arrangement of the controller of the invention in conjunction with a hydraulic press operation.

Figure 1:
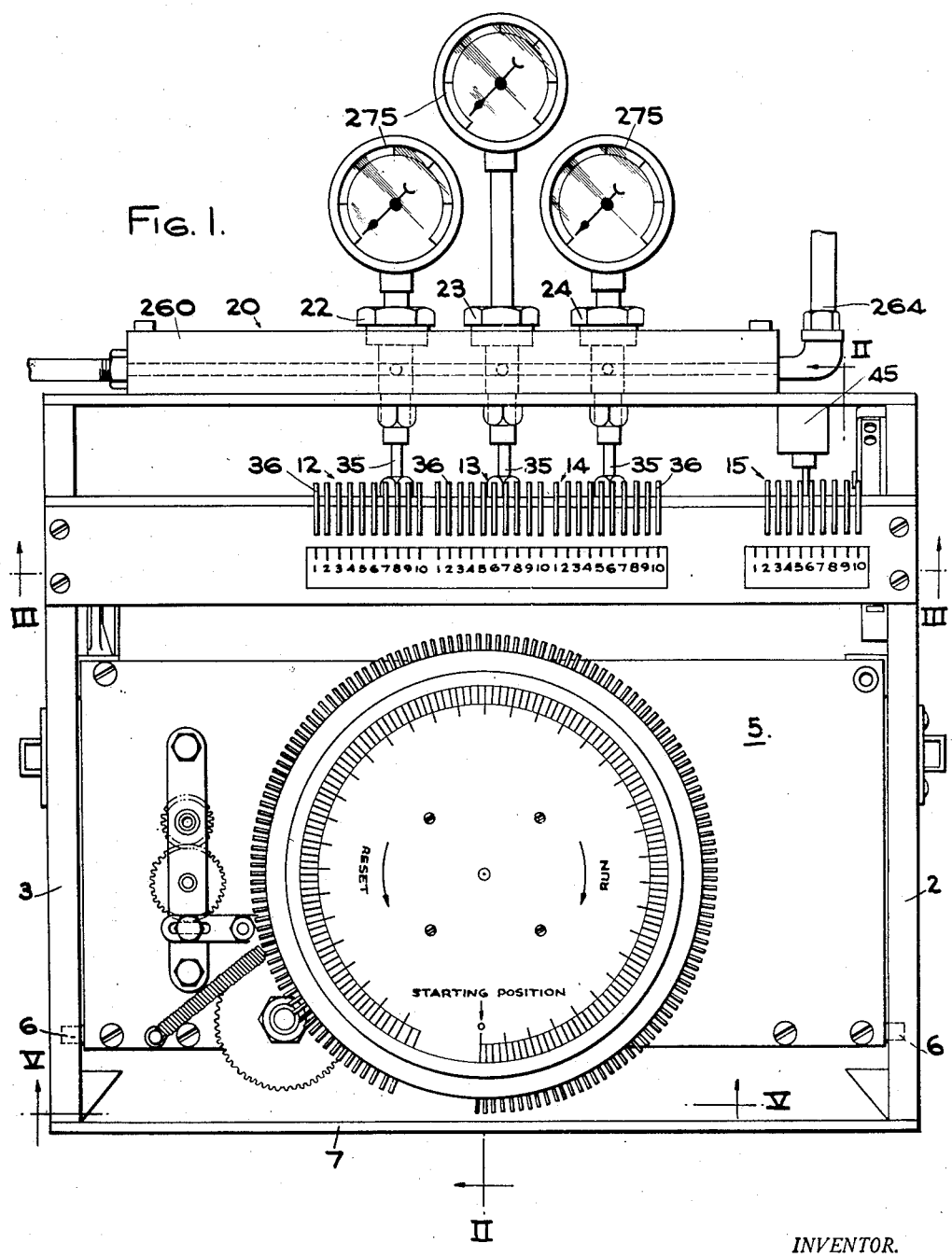
Fig. 1 is a front elevation of a typical time cycle controller of the invention with the front cover of the carrying case thereof removed.
Figure 2:
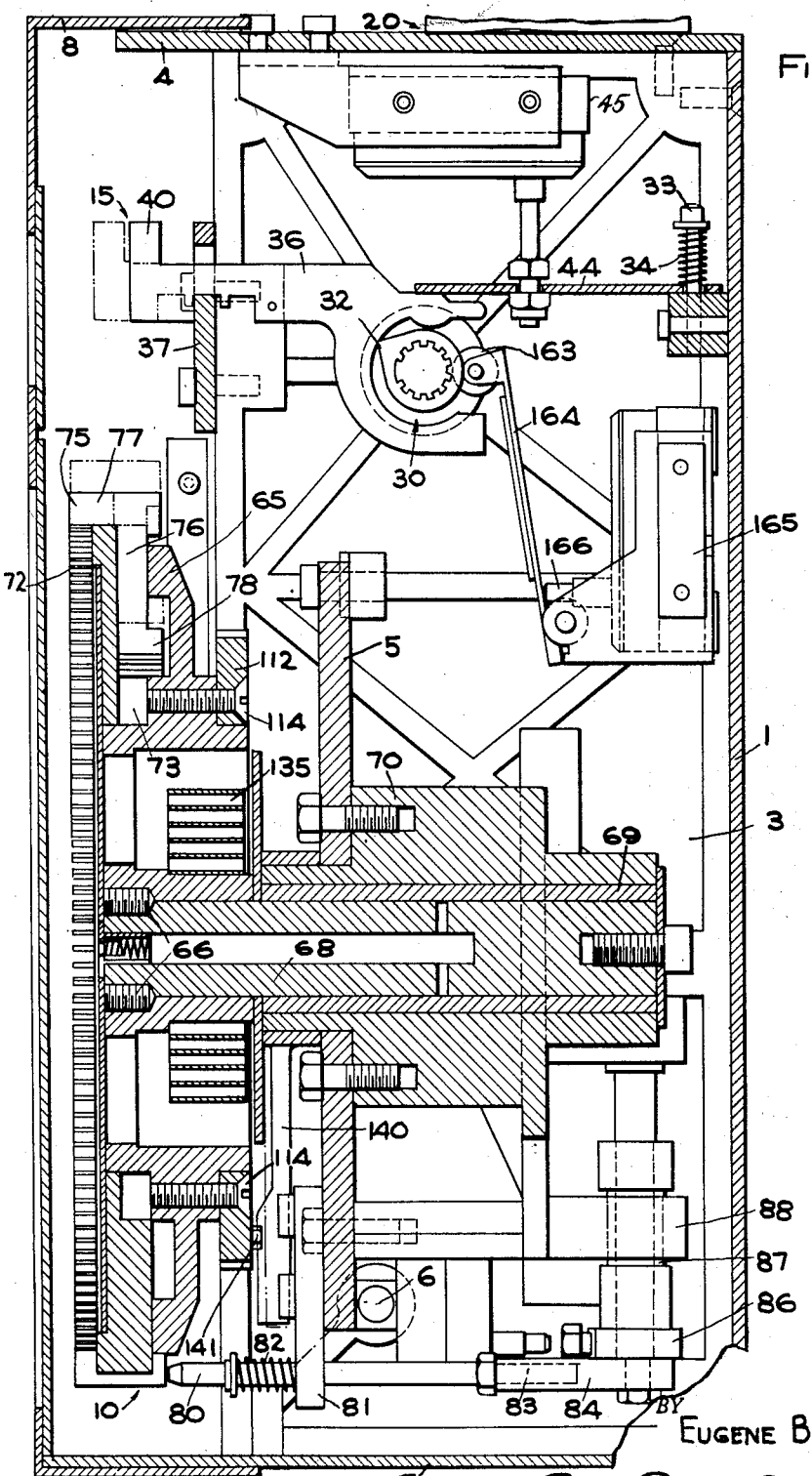
Fig. 2 is a fragmentary section, on an enlarged scale, taken along line II—II of Fig. 1.
Figure 3:
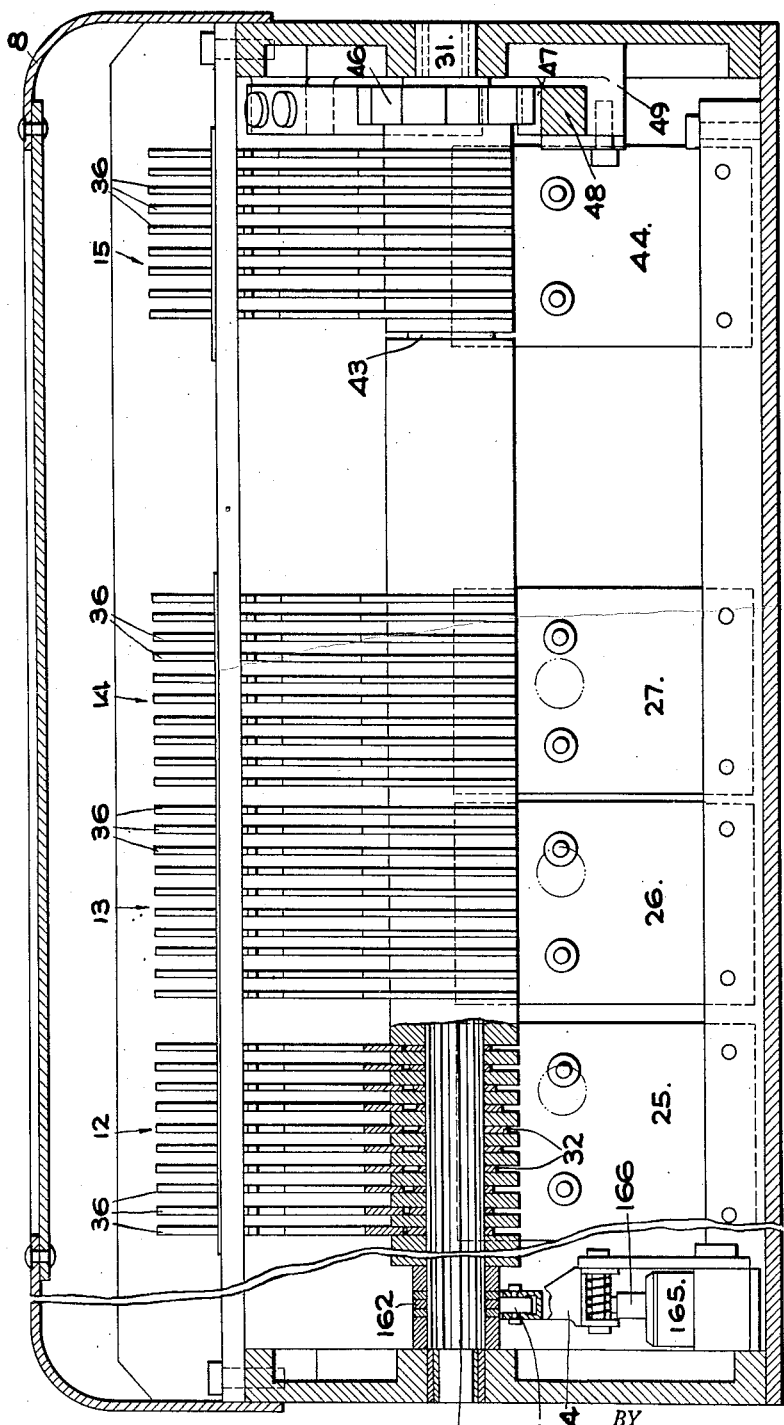
Fig. 3 is a section, on an enlarged scale, along line III—III of Fig. 1.
Figure 5:
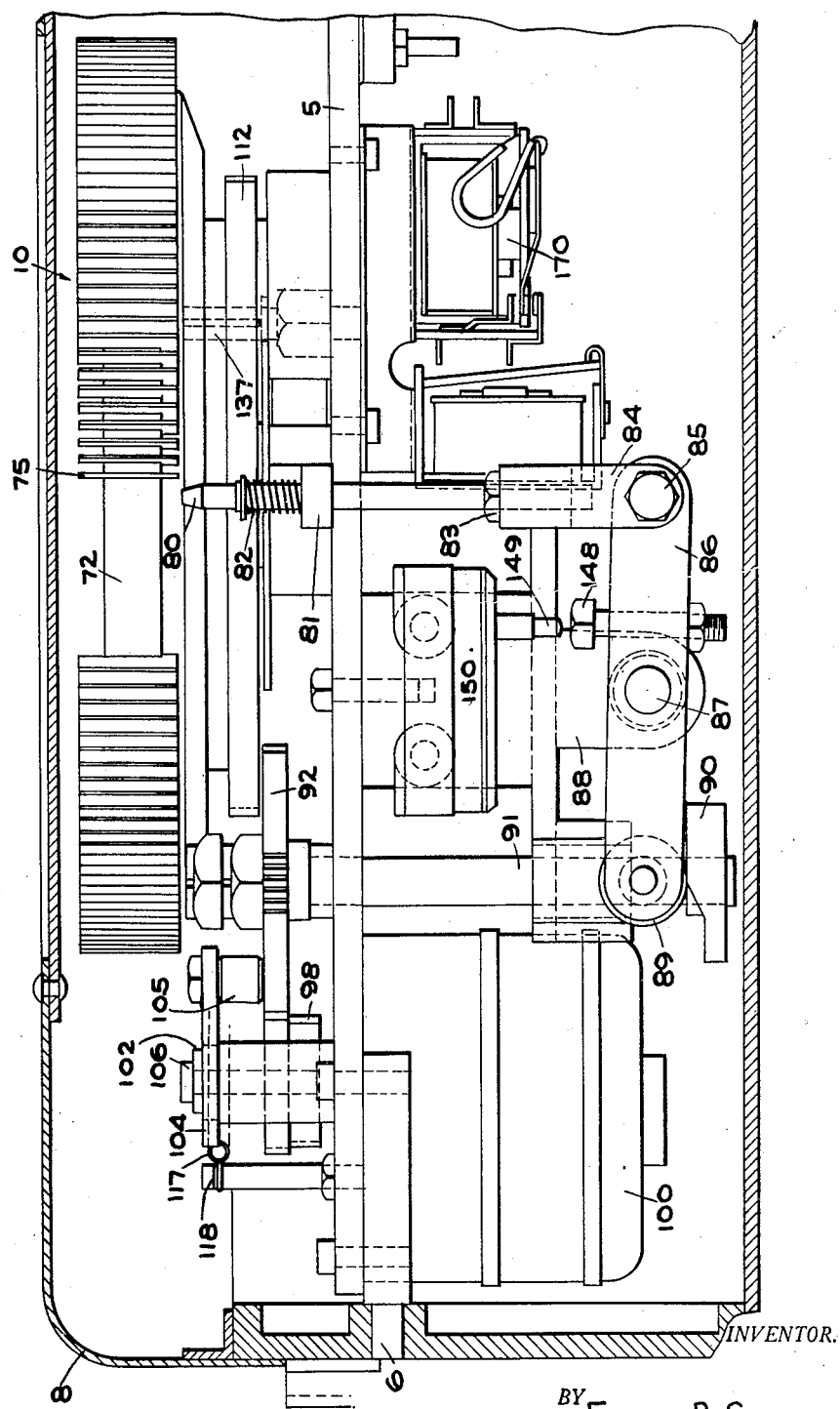
Fig. 5 is a fragmentary section, on an enlarged scale, as along line V—V of Fig. 1.

The drawings illustrate the invention by way of example to comprise a compact control mechanism so constructed and mounted within a casing as to be readily portable from one point of use to another. However, it will be understood that the invention is also adapted to be embodied in other physical forms and arrangements in lieu of the form shown herein. More specifically, the mechanism of the invention as illustrated herein includes a casing comprising a back board or base panel 1; a right end wall 2; a left end wall 3; a top plate 4; and a front or sub-base panel 5 which is pivotally mounted upon the end walls by pin and socket connections 6—6 but normally disposed to be parallel to the back board 1. A bottom floor as at 7 may also be provided for the casing as well as a detachable front cover 8 (Figs. 2, 3, 5). The front cover 8 is apertured as at 9 to expose the time control wheel 10 of the mechanism, and also at 11 to expose a bank of operation index control keys which are grouped as indicated generally at 12, 13, 14, 15.

A pilot control unit is mounted as indicated generally at 20 upon the top plate 4 of the casing; the control unit 20 comprising in the example shown a series of hydraulic pilot control units designated generally at 22, 23, 24 which are provided to control the mechanisms to be governed by the time cycle controller of the invention. Thus, for example, in event the time cycle controller is to be employed to cyclically control a series of hydraulic press operational sequences as illustrated in Fig. 14, the pilot valves controlling application of pressure fluids to the operative elements of the press mechanism will be incorporated in the control unit 20. The control valves 22, 23, 24 are so positioned as to be disposed in operative registry with corresponding treadles 25, 26, 27 of the controller, as shown in Figs. 2, 3, 10. However, it will be understood that the pilot control unit may employ electrical switches or relays or mechanical devices such as are suitable for controlling the operations of the system to be governed by the controller of the invention; and for example, in event the controller is to be employed to govern electrically operated devices the pilot control unit 20 will include series of switches arranged respectively in operative registry with the treadles 25, 26, 27. Or, if it is preferred the treadles of the controller may be in any other suitable manner arranged in operative connection with the devices which directly govern actuation of the operative mechanisms to be controlled, as by suitable remote control devices or the like.

The treadle devices of the controller will be furnished in any case in whatever number may be required for separate actuations of the devices to be controlled; and although for purposes of illustration herein only three such treadles and pilot valves are shown, and it will be understood that the controller of the invention may be as readily constructed to provide for selective control of any other number of operating mechanisms.

The mechanism of the controller of the invention can be basically divided into two portions; an operation index portion, and a time interval and cycle control portion. The operation index portion of the mechanism includes a cam shaft which is indicated generally at 30 to be rotatably mounted upon the end walls 2—3 of the casing while extending below the position of the pilot control unit 20 and parallel thereto. The cam shaft 30 comprises, more specifically as shown in Fig. 12, a core 31 upon which are slidably assembled in spline connection relation thereon pluralities of cam plates 32; the cams 32 being consecutively spaced and assembled on the cam shaft in groups which positionally correspond to the treadles 25, 26, 27. The treadles are each pivotally mounted upon the back board 1 by means of pins 33 and springs 34 (Figs. 2, 10) to extend horizontally while being adapted to be pushed upwardly at their forward ends into lifting relation against a push pin 35 of the corresponding pilot valve. The treadles are each arranged to be lifted by any one member of the corresponding group of index keys designated 12, 13, 14 as referred to hereinabove.

The index keys are individually designated at 36 and are mounted to rest upon a cross bar 37 of the casing, and each key has a boss 38 extending downwardly therefrom to maintain the key in either its pulled-out or pushed-in position. The keys 36 project at their outer ends so as to be readily accessible for manual settings thereof and are each provided thereat with enlarged finger tip portions 40. At their inner ends the keys 36 are fork-shaped and straddle corresponding cam plates 32, and each key is formed with an enlarged cam-operable portion 41 and a reduced end portion 42. Thus, as shown in Figs. 2, 10, when a key 36 is in its pushed-in or operative position, the enlarged portion 41 thereof is disposed between the cam 32 and the outer end of the corresponding treadle so that upon rotation of the cam 32 into key lifting position the treadle will be also lifted to actuate the pin 35 of the corresponding pilot valve. However, whenever the keys 36 are pulled out to their inoperative positions similar rotation of the cams will procure no actuations of the corresponding pilot valves.

The mechanism of the invention may be arranged to provide any desired number of increments to each operational cycle, and for purposes of illustration the device shown herein is arranged to provide for any number of such increments up to ten. That is, the mechanism is arranged to provide for up to ten operative actuations of the treadles 25—26—27 completing one cycle of controlled system operation. Therefore, in the case of the present showing, the banks of index keys 12, 13, 14 each comprise a group of ten keys which are individually designated 36. A special final reset control cam is keyed upon the cam shaft 30 as indicated at 43 (Fig. 3) for direct operation at the end of each complete rotation of the cam shaft 30 against a reset control treadle 44 which is similar to the treadles 25—26—27 but arranged to actuate the control finger of a snap action type switch or any other suitable electric control device as indicated at 45 (Fig. 2) for energizing an electrical circuit resulting in return of the cam shaft 30 to its starting or zero position and resetting the time wheel to its starting position, as will be explained in detail hereinafter. Also, as indicated at 15, a bank of nine keys 36 similar to the keys 36 of banks 12, 13, 14, is arranged to act upon the treadle 44 in cooperation with cams 32 carried by the shaft 31 at consecutive positions thereon beginning with the cam shaft No. 2 position; to permit the operator to adjust the index mechanism to suit cycles requiring less than ten operational sequences, as will be explained hereinafter. The snap action switch 45 above referred to may be of the so-called micro switch type, and inasmuch as several such switches are employed in the mechanism and are hereinafter referred to they will be designated hereinafter as "micro-switches."

At the zero position of the cam shaft 30 the entire control device is designed to be inoperative, and therefore the cam shaft 30 in the instance shown must be operatively divided into twelve angularly spaced increments in order to provide for a neutral starting and a resetting position as well as for the ten pilot operative positions referred to hereinabove. Hence, as shown in Fig. 12, the shaft and cam plate unit will be so assembled as to employ thereon at positions corresponding to the key groups 12—13—14 series of cam plates 32 in each instance comprising ten cams having their camming points progressively displaced peripherally of the cam shaft at 30° angles. The No. 1 cam of each group is pointed 30° away from the cam shaft neutral or starting position; the last cam plate of each group being pointed 300° away from the starting position on the cam shaft. The special final reset cam 43 is then set upon the cam shaft so as to point 330° away from cam shaft starting position.

A mechanism is provided to rotate the cam shaft 30 intermittently so as to bring the cams 32 of each group successively into treadle operative positions. Therefore, in the instance being shown and described the cam shaft driving mechanism is arranged to cause the cam shaft to intermittently rotate only 30° about the cam shaft axis, commencing from the zero or starting position thereof. As shown herein, the cam shaft drive mechanism comprises a ratchet wheel 46 (Figs. 7–8) which is keyed to the cam shaft 30 and driven by a spring pawl 47 which is carried by a pitman 48 mounted upon slide bearings 49—49 extending from the end wall 2 of the casing. The pitman 48 pivots as at 50 upon a connecting rod 51 which is pivotally connected at its other end to a pin 52 carried by a wheel 53 which is formed with a gear portion 54 integral therewith.

The gear 54 is driven by a gear 55 which is keyed to the drive shaft of a synchronous motor 60. A ratchet stop in the form of a leaf spring 61 is mounted at its upper end to extend in cantilever fashion from the end wall 2 and to engage at its other end with the ratchet 46 so as to prevent retrograde rotation of the cam shaft 30 intermediately of down strokes of the pitman 48. The ratchet 46 is provided with twelve teeth, and therefore each reciprocative actuation of the pitman 48 will provide $\frac{1}{12}$ of a revolution of the cam shaft 30 during the down stroke of the pitman 48; and the ratchet and cam plate devices are so relatively arranged on the cam shaft core 31 that at the end of each down stroke of the pitman 48 the cam shaft will be thereby set to a new cam operative position. The motor 60 of the cam shaft indexing mechanism has an output shaft speed of 60 R. P. M., and thus approximately one second is required for each cycle of operation of the indexing mechanism. The wheel 53 is cam faced as shown (Fig. 8) to oscillate a lever 62 for actuation of the operating finger 63 of a snap switch device 64 which will be hereinafter referred to as the "index microswitch"; and automatic electrical control of the motor 60 is provided for as will be explained hereinafter.

The time control wheel 10 comprises a circular body member 65 (Fig. 2) having a hub portion keyed at 66 upon a drive shaft 68 which is carried within a bushing 69 and a bearing block 70 which is bolted to the sub-base panel 5 so that the shaft 68 extends through the panel 5 and rotatably mounts the wheel body 65 thereon. A circular front plate 72 is fitted against the wheel body 65, and the parts 65—72 are suitably cut away as indicated at 73 to provide a series of grooves extending radially of the time wheel in uniformly spaced relation therearound as viewed in front elevation. A time key as designated at 75 is slidably fitted into each of the radially extending grooves provided by the cooperating recessed parts of the wheel portions 65—72; the keys 75 being substantially flat-shaped and each formed to comprise a leaf spring type central body portion 76; a transverse outer end portion 77; and a laterally turned inner end portion 78. The outer end portion 77 is adapted to be manually gripped by the operator of the machine to apply push-pull forces upon the keys selectively to overcome the friction furnished by the resiliency of the keys and to set the keys as required; the extent of push-pull responsive movements of each key being limited by abutting co-action of the bent end portion 78 thereof with the ends of the recessed portion of the wheel body 65.

A feeler pin 80 is slidably mounted to extend through a bearing block 81 carried by the panel 5 (Figs. 2 and 5) to extend at its outer end into axial registry with the rear edges of the key portions 77 as the wheel 10 is rotated to present successive keys into positions of alignment with the feeler pin 80, as will be explained hereinafter. The keys 75 are so shaped that whenever they are maintained upon the wheel body 65 in their pushed-in positions the feeler pin will register with the rearwardly extending end portions 77 thereof, whereas whenever the keys are displaced to their pulled-out positions relative to the wheel body 65 the retracted central body portions 76 of the keys will be brought into registry with the feeler pin 80.

The pin 80 is normally biased outwardly by a spring 82, and at its inner end the pin 80 is threaded rigidly into connection at 83 with a clevis 84 which pivotally connects at 85 to one end of a lever 86 which is fulcrumed at 87 upon a bracket 88 bolted to the panel 5. The other end of the lever 86 carries a roller 89 which engages the face of a cam wheel 90 carried by a shaft 91 which is rotatably mounted upon the bracket 88. The shaft 91 carries at its other end a gear 92 which meshes with a gear 93 carried upon a positioner cam shaft 94 which is also rotatably mounted upon the panel 5 by a suitable bearing. The gear 93 also meshes with a drive gear 95 which is carried by stub shaft 96 also mounting a gear 97; the gear 97 being meshed in turn with a gear 98 which is keyed to the drive shaft 99 of a synchronous capacitor type motor 100. The shafts 96—99 are rotatably mounted upon a bracket 102 which is bolted to the panel 5 as at 103—103. The bracket 102 also mounts a laterally extending arm 104 which carries at its outer end a roller 105 and is slotted at its inner end to receive a bolt connection 106 to the bracket 102 so that the roller 105 is positionally adjustable in directions laterally of the holding bracket, for a purpose to be hereinafter explained.

The gear shaft 94 carries an eccentrically disposed crank pin 107 on which is fulcrumed a pusher lever 108. The upper end of the lever 108 is formed with an adjustable tooth 110 for intermittently geared engagement with a ratchet wheel 112 (Figs. 2, 4, 5) which is bolted as at 114 to the rear of the wheel body 65 concentrically thereof. At its lower end the pusher lever 108 is connected at 116 to one end of a tension spring 117; the other end of the tension spring being connected at 118 to a fixed bracket portion of the sub-base panel 5 at such position thereon as to arrange the spring 117 to bias the lower end of the lever 108 against the roller 105. Thus, as the eccentric fulcrum 107 rotates, the upper end of the lever 108 is revolved in such manner that the pusher tooth 110 intermittently engages the ratchet wheel 112 to cause the latter to advance a distance equal to the space between adjacent teeth thereon in clockwise direction as viewed in Fig. 4. Intermediately of each ratchet wheel advancement the roller 105 and the eccentric fulcrum 107 cooperate to withdraw the pusher tooth 110 from the ratchet wheel 112 so as to permit the time wheel to rotate backwardly incidental to resetting of the controller as will be explained hereinafter. A pawl 120 (Fig. 4) is carried by a shaft 122 so as to normally engage the ratchet 112 to hold the time wheel stationary during each back stroke of the pusher.

Figure 6:
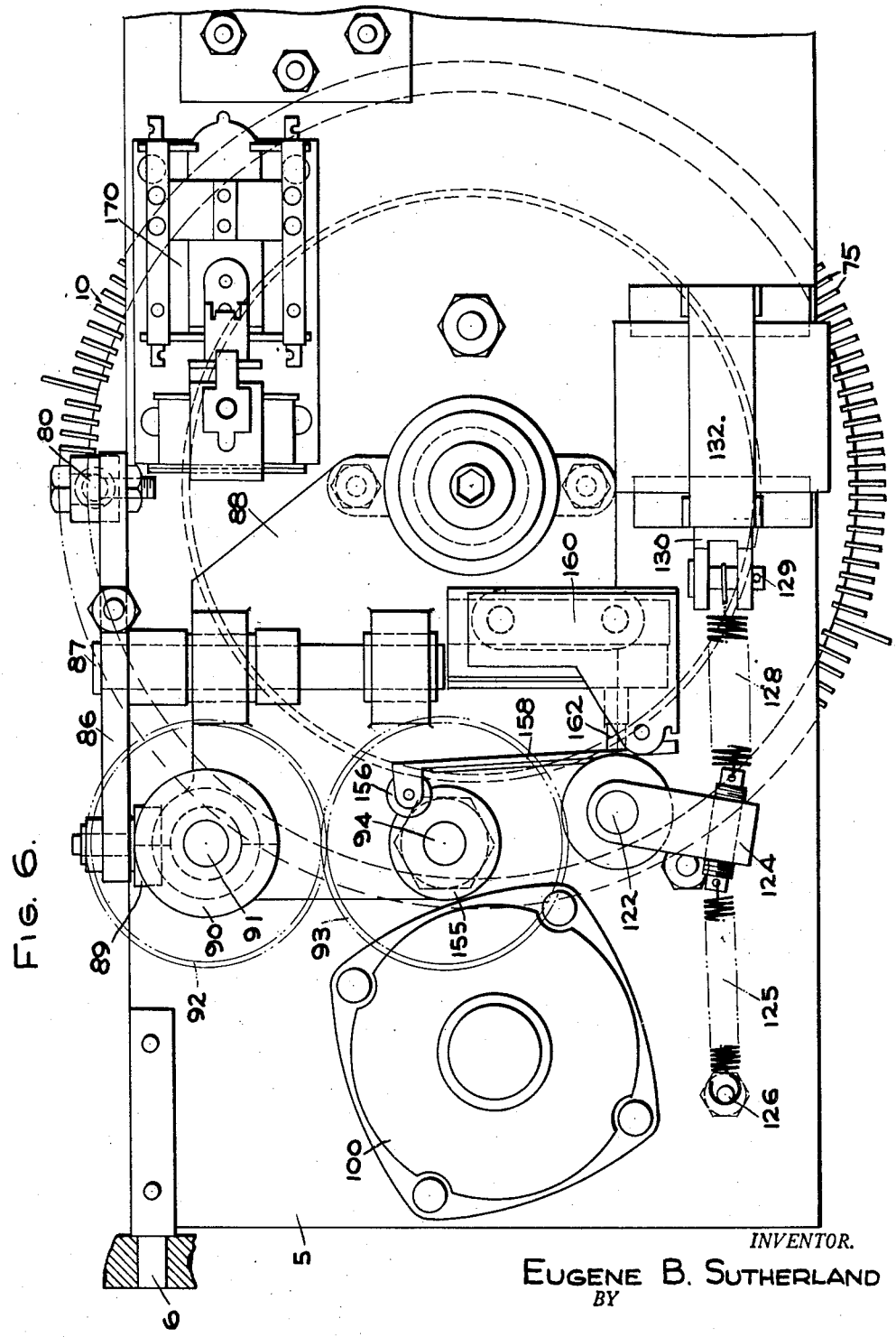
Fig. 6 is a rear elevation of the mechanism of Figs. 4–5.

The shaft 122 which carries the pawl 120 is rotatably mounted upon the panel 5 and carries a crank arm 124 (Fig. 6) which connects to one end of a tension spring 125 which is fixed in turn at its other end 126 to the panel 5 for biasing the crank shaft 122 in clockwise direction as viewed in Fig. 6. The arm 124 also connects to one end of a tension spring 128 which extends from connection 129 to the armature 130 of a latch solenoid designated generally at 132. The crank and spring and latch devices are so adjusted and arranged that the latch solenoid normally operates to pull the pawl 120 into meshed relation with the ratchet wheel 112 for blocking the latter against retrograde rotation. However, as will be explained more fully hereinafter the latch solenoid 132 is arranged to be operated electrically incidental to resetting of the machine at the end of each operational cycle thereof so as to withdraw the pawl 120 from the ratchet 112 to permit the time wheel to rotate in counter-clockwise direction as viewed in Fig. 4 so as to return to its original starting position.

Figure 4:
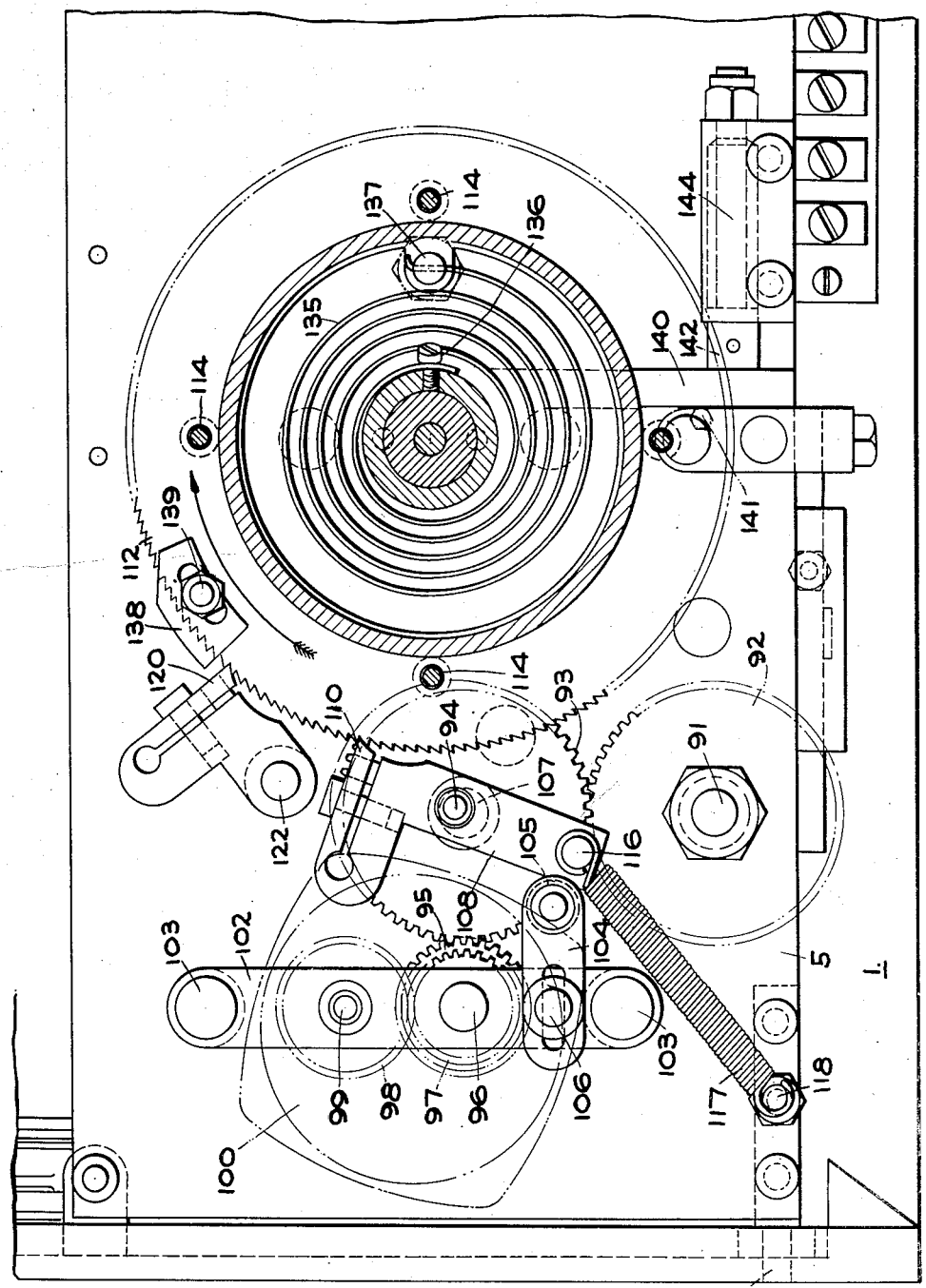
Fig. 4 is a fragmentary front elevation, on a larger scale, of a portion of the mechanism, with the time control wheel thereof removed.

To cause the time wheel to return to starting position whenever released by the ratchet 120 a clock type spring is employed as indicated at 135 Figs. 2 and 4; the inner end of the spring being connected at 136 to the hub of the time wheel 65 and the outer end of the spring 135 being connected to a post 137 extending rigidly from the panel 5. An adjustable stop block 138 is bolted as indicated at 139 to the ratchet 112 for limiting retrograde rotation of the time wheel to proper restarting position, and to cushion the stoppage of the return movement of the time wheel an arm 140 is carried by the wheel hub to float thereon in vertically hanging relation and to be bumped against by a stud 141 which presses the arm 140 into abutting registry with the movable member 142 of a telescopic spring-cushioned shock absorber device indicated generally at 144 (Fig. 4).

The ratchet mechanism 108—112 is so selected as to cause the time wheel to be driven during each increment of rotation thereof for a distance equal to the space between adjacent time control keys on the wheel 10; and it will be understood that the motor speed may be so selected and the gear train so arranged that successive increments of movement of the time wheel occur after any desired time lapses therebetween. Also, it will be understood that the time selector keys may be arranged in conjunction with a properly corresponding ratchet wheel so as to provide any desired number of time interval spaces about the periphery of the time wheel so that the time increments between successive keys may constitute any desired portions of the total maximum time for a complete operational cycle. In the example illustrated herein, however, the ratchet and the time selector keys have been provided in such number as to offer available time increments equal to 1/150 of the total maximum time for each operational cycle.

As will be explained hereinafter, the time wheel drive motor 100 is arranged to be electrically controlled so that upon closing of an operation starting switch the motor will be energized to run at a predetermined speed so as to intermittently rotate the time wheel at predetermined time intervals so as to bring successive of the keys 75 into axial alignment with the feeler pin 80. Simultaneously with such operation the cam wheel 90 is driven by the motor and gear mechanism so as to rotate once in synchronism with each advance of the time wheel; thereby bringing the retracted dwell portion of the cam 90 into registry with the roller 89 on the feeler lever 86, whereby whenever a pulled out time key 75 arrives into registering position with respect to the feeler pin 80 and the cam wheel 90 rotates so as to free the roller 89, the feeler pin spring 82 will operate to displace the feeler pin 80 outwardly into the space previously occupied by the key. This permits the lever 86 to rock about its fulcrum 87 whereupon an adjustable screw boss 148 carried by the lever 86 will be brought to bear against the actuating finger portion 149 of a snap or "micro-switch" 150; the switch 150 being hereinafter referred to as the "feeler micro-switch."

As will be explained hereinafter in connection with the wiring diagram of the mechanism, such actuation of the feeler micro switch 150 causes energization of the circuit controlling the motor 60 and procures a single indexing rotation of the cam shaft 30 through a 30° angle of rotation as explained hereinabove. Further rotation of the cam wheel 90 thereupon immediately retracts the feeler pin 80 out of the path of the time wheel keys so that the next advancement of the time wheel by the ratchet pusher 108 will experience no interference from the feeler 10. Upon arrival of the time wheel at the next successive position of advancement the feeler pin control operation described hereinabove will be repeated. That is, if the next time the key is in its pushed-in position, the feeler pin will be thereby blocked against actuation of the micro switch 150, but if the next time key is in its pulled-out position the feeler pin will be thereby released again for actuation of the micro switch to initiate another cam shaft indexing operation.

As shown in Fig. 6, the time wheel mechanism drive shaft 94 carries a rotary cam 155 engaging the roller 156 of the lever 158 of an electrical switch 160. The switch 160 is hereinafter being referred to as the "positioner microswitch," and has its actuating finger 162 in alignment with the pivoted lever 158. The cam 155 has a flat portion adapted to permit the lever 158 to move away from the body of the switch 160 at intervals synchronized with operations of the time wheel ratchet pusher 108 and the feeler pin 80. The switch 160 is electrically connected into the time motor control system, as will be explained more fully hereinafter, so that the positioner micro-switch operation will assure that whenever a cycle of controlled operation terminates, the time motor will stop in such a position that the pusher 108 is out of mesh with the time wheel ratchet 112 and that the feeler pin 80 is maintained in a retracted position so as to clear the time keys 75 to permit the time wheel to return again to zero or starting position under the influence of the spring 135 as explained hereinabove.

As shown in Fig. 3, the cam shaft 31 mounts a cam 162 which bears against a roller 163 carried by the actuating lever 164 (Figs. 2–3) of an electrical snap switch 165 which will be hereinafter referred to as the "safety micro-switch." The switch 165 has its actuating pin 166 in registry with the lever 164 thereof so that for each complete revolution of the cam shaft 30 the micro switch 165 will be actuated for a purpose to be explained hereinafter.

Figure 13:
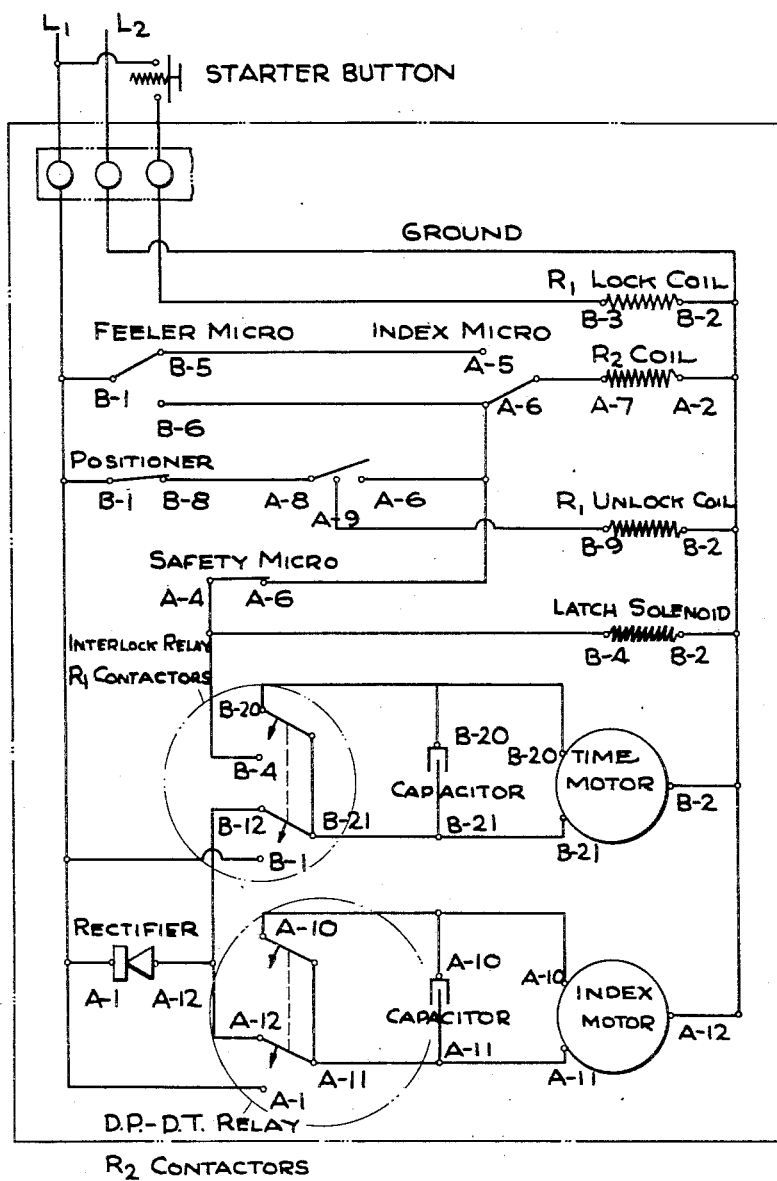
Fig. 13 is a wiring diagram of the time cycle controller of Figs. 1–12.

The electrical circuits and control appliances for the mechanism are indicated schematically in Fig. 13, and the functions and operation thereof will now be explained by reciting a typical time cycle control operation of the mechanism. The electrical system of the mechanism is arranged so that when the controller mechanism is inoperative the cam shaft index and time wheel drive motors 60—100 are paralyzed and locked by the output of a rectifier (shown in the lower left hand corner of Fig. 13) connected to the main A. C. power leads L—1, L—2 at the upper left hand corner of the figure. Operation of the mechanism is initiated by momentary manual closing of the starter switch which is shown at the top portion of the drawing; the switch being normally held open by a spring mechanism therein. This momentarily energizes the lock coil of a relay designated R1 in the upper right hand corner of the drawing, which operates to pull the contactors (designated R1 contactors in Fig. 13) from their up positions as shown in the drawing to their down positions where they are mechanically locked. Relay 1 is shown at 170 in Figs. 5–6.

Referring again to Fig. 13, this first operation of the relay 1 disconnects the direct current from the rectifier (shown at the lower left hand corner Fig. 13) to the time motor and supplies 60 cycle current through terminal B—1 to B—21 and thus to the time motor 100 and through the capacitor to terminal B—20 and the starting coil of the motor 100; thus starting this motor into operation. Current is simultaneously supplied through the upper contactor of relay 1 to terminal B—4 thereby energizing the latch solenoid (132, Fig. 6) which causes the pawl 120 to engage the ratchet 112 of the time wheel 10. Current is also thereby supplied to terminal A—4 (Fig. 13) of the safety micro switch 165 (Figs. 2, 3). The safety micro-switch is held in circuit-closed position when the controller cam shaft 30 is at its zero or starting position, and therefore current passes through the switch to terminal A—6 to energize the coil of relay No. 2. This holds the contactors of relay No. 2 (lower central portion of Fig. 13) to their down positions, thereby disconnecting the D. C. current from the index motor 60 and supplying A. C. current thereto for operating the motor.

Thus, operation of the index motor 60 is initiated, and whenever the indexing pitman 48 (Fig. 8) reaches the top of its stroke the index micro 64 is operated by the lever 62 thereby cutting the current supply from A—6. Current is then supplied from the feeler micro terminal B—5 to A—5 on the index micro to again energize the relay to cause the index pitman 48 to make its downward stroke, thus completing the first indexing cycle. On the down stroke of the index pitman 47 the safety micro 165 is released by the cam 162 on the cam shaft 30 (Fig. 3) and the safety micro is not closed again until at the end of a complete operational cycle when the index cam shaft returns to its zero or starting position. When the index micro returns to normal at the completion of the first indexing operation, the A. C. current is cut off from relay 2 coil and the index motor 60 is stopped instantly by the D. C. current flowing from the rectifier through terminals A—12, A—11, and A—10. The time motor 100, however, continues to run thereby intermittently advancing the time wheel 10 as explained hereinabove. Whenever the time wheel is so advanced to such a position that a pulled out key 75 registers with the feeler pin 80, the feeler pin will move outwardly as explained hereinabove thereby operating the feeler micro 150. Referring again to the diagram 13, this will cause current to pass through terminal B—1 to B—6 and to A—6 on the index micro, energizing relay 2 coil which again starts the index motor 60 to drive the pitman 48 through the first half of another shaft indexing operation. At the top position of the pitman the index micro is again operated; relay 2 coil is de-energized; and the index motor stops until the feeler pin 80 is withdrawn from the time wheel and the feeler micro returns to the position thereof as shown in Fig. 13. Current is then supplied through the top half of the circuit to again energize relay 2 coil and to complete the cam shaft indexing movement, thereby turning the cam shaft into its No. 2 position.

As the time wheel continues to rotate the operation hereinabove described will be repeated as often as may be required and as determined by the number of time keys that have been pulled out to their operative positions; the time periods between successive indexing operations being determined by the interval spaces between adjacent pulled-out time keys.

At the end of a complete operational cycle of the control mechanism of the invention the reset micro 45 is closed by operation of the special cam 43 against the treadle 44 during the downward stroke of the index pitman 48 and while the positioner micro 160 is in its open position. However, when the positioner micro is closed as a result of the flat portion of the cam 155 (Fig. 6) coming into registry with the roller 156 current will be supplied through the reset micro to relay 1 unlock coil and through the index micro to relay 2 coil. The further action of relay 2 coil will be described hereinafter. Relay 1 unlock coil thereupon releases the relay 1 contactors to return to their normal position as shown in Fig. 13, thereby stopping the time motor 100 and releasing the latch solenoid 132 which permits the time wheel to reset itself to zero or starting position in response to the forces of the clock spring 135. Or, if the operational cycle calls for use of less than the ten maximum total indexing actuations provided for in the case of the present showing, the operator will have displaced to their pushed-in positions all of the index control keys of the reset bank 15 which commence with the key corresponding to the first unneeded index position and ending with the last key of the group. The relay 2 coil will thereupon be supplied with current alternately through the reset switch circuit and the normally closed feeler circuit; the reset switch being held closed by consecutive raisings of peripherally spaced cams 32 against the keys of the reset key section 15 that have been operator-adjusted to their "in" or operative positions, until the reset cam 43 takes over as explained hereinabove.

As the cam shaft 30 arrives at its zero or No. 12 position the cam 43 retreats to permit the reset micro to open, and relay 2 coil will thereupon be de-energized at the end of the last down stroke of the index pitman 48. The entire controller mechanism is then at rest and in position to be restarted by operator-manipulation of the starter button for repetition of the time cycle control operation described hereinabove.

Thus, it will be understood that the controller mechanism of the invention provides a wide range of adaptability for variably governing a plurality of operations without changing the mechanism per se such as by substituting cams or drive gear mechanisms in order to convert the controller to various control programs. In the case of the invention such conversions are accomplished simply by varying the selections of the indexing and time control keys as explained hereinabove; the keys 36 being arranged to index or relatively coordinate the various operations to be controlled by the mechanism, and the time control keys 75 being arranged to regulate the time lapse intervals between successive of the indexed operations.

For example, the controller of the invention has been illustrated and hereinabove described to be constructed of such form as to be suited to automatically control three separate machine operations in predetermined time sequences for each complete cycle of operation. Fig. 14 illustrates schematically by way of further example, a typical application of the controller of Figs. 1–13 to a hydraulic press operation wherein the hydraulic press is designated generally at 200 to comprise a stationary platen 201 and a movable platen 202 which is designed to be actuated by a hydraulic piston-cylinder arrangement or ram 204. Also, the platens 201—202 are arranged to be alternately steam-heated and water-cooled.

The hydraulic ram device is shown to be serviced by a conduit 205 leading from the pressure fluid outlet port of a three-way valve 206. A conduit 208 supplies pressure fluid to the inlet port of the valve 206 and a conduit 210 is provided to drain or carry returning fluid to the supply system incidental to reopening of the press 200. The platens 201—202 are jacketed and supplied with both steam and cold water through a conduit 212. A common drainage conduit 214 leads away from the platen jackets into a three-way valve 215 which discharges either into a water drain line 216 or into a steam trap 218, as will be explained hereinafter. A steam supply conduit is illustrated at 220 and a cold water supply conduit is shown at 222. Flow of steam from the conduit 220 into the conduit 212 is controlled by a two-way valve 225; and flow of cold water from the conduit 222 into the conduit 212 is controlled by a two-way valve 230.

The valves 225—230 are shown to be of pressure-responsive diaphragm type and are arranged to be simultaneously actuated in response to pressure changes in a conduit 232; the valves 225—230 being arranged to alternately open and close in opposite relation in response to presence or absence of pressure in the conduit 232. Thus, for example, the spring device of valve 225 may be arranged to normally maintain the valve open so as to prevent passage of steam from the conduit 220 to the conduit 212 when there is no pressure in the control conduit 232; while the spring device of valve 230 is arranged to maintain the latter under similar conditions in closed position against passage of cold water into the press platens. Upon application of pressure to the conduit 232, however, the valve 225 will close against the spring device while the valve 230 opens to permit cold water to pass through the press in lieu of steam.

Similarly, the valves 206 and 215 may be arranged to be operated in response to pressure changes in their corresponding control conduits 234—236. Thus it may be arranged that application of pressure to the conduit 234 will cause the press 200 to close, while release of pressure on the conduit 234 causes the press 200 to open, while alternate application and release of pressure on the conduit 236 will cause the control valve 215 to discharge alternately through the drain 216 and through the steam trap 218.

A controller device of the invention as applied to the system of Fig. 14 is illustrated at 240 to comprise a controller mechanism having three pilot control valve devices indicated at 250, 252, and 254 which correspond to the pilot control units designated generally at 22, 23, 24 in Figs. 1, 9, 10, 11 of the drawing. However, as explained hereinabove, the controller is illustrated herein to incorporate only three such pilot control units by way of one example only, and any other number of pilot control units may be embodied in the controller of the invention simply by multiplying the number of cam index groups and pilot control units thereof.

As shown more in detail in Figs. 1, 9, 10, 11, the pilot control portion of the mechanism may comprise a housing 260 which is longitudinally bored as indicated at 262 to convey pressured fluid such as compressed air therethrough from a suitable supply conduit 264 into communication with the pilot control units 22—23—24. The housing 260 is vertically bored to receive in the case of each of the pilot units a valve body 265 (Figs. 10 and 11) which is vertically bored to receive in vertically slidable relation therein a valve stem 266. A spring 267 normally holds the valve stem 266 down. The stem 266 is transversely drilled as indicated at 268. The valve body 265 is also transversely bored as indicated at 270 in open communication in each instance with the compressed air chamber 262 of the housing, and behind the position of each of the valve units the housing 260 is bored to provide air outlet channels 272 which lead into connection, respectively, with the pilot valve control conduits 232—234—236. Pressure gauges as indicated at 275 are preferably tapped into the conduits 232—234—236 so as to provide readily visible indications of the pressure conditions within each of the conduits.

For example, if it is desired to open either one of the pilot control valve units 22—23—24 in the first step of a controlled operational cycle, the number one key under this valve unit will be pushed in by the operator. Then, if it is desired to hold this valve open during the second step of the operational cycle, and to open another of the pilot valves, the second key in each of the index key groups corresponding to these control units will be displaced inwardly to their operative positions. If the third step of the operational cycle requires that the first valve be closed and the second valve left open and the third valve to be then opened, the third key in the key group corresponding to the first valve will be left in its out or inoperative position, and the third keys of the second and third pilot unit groups will both be moved in to their operative positions. This style of key selection may be carried on through any desired portion of the total of the operational steps which are made available by the mechanism which has been shown and described.

Thus, in setting the control mechanism it must be remembered that each key of each indexing group is independent of all other keys in its group, and that the number one key of each group is effective only during the first step of an operational cycle and No. 2 key of each group is effective only during the second step of the same operational cycle, and so on. Consequently, each pilot valve unit operates independently of the others and may be arranged to be opened and closed without regard to operations of the other pilot control units.

In event the operational cycle to be performed does not require full use of the ten steps made available for example in the case of the mechanism as illustrated herein, the unneeded steps must be "cleared" or neutralized by pushing in the reset control keys of the key group 15 which correspond to the unneeded steps. Thus, for example if the operational cycle requires only three steps to be performed, the reset keys beginning with the key corresponding to step number four and ending with the last key of group 15 will be pushed in so that the controller will operate automatically to return at once to its starting position as soon as the prescribed operational steps have been performed.

Referring again to Fig. 14, the schematic arrangement shown therein will permit the controller device of the invention to control the press 200, for example, in the following manner. Upon closing of the starter button of the controller the pilot valve 250 will be automatically actuated to operate the pressure control valve 206 so as to let pressured fluid into the press ram 204 for closing the press. Simultaneously, the pilot valve 252 may operate to permit compressed air to flow through the conduit 232 into the valves 225—230. This will cause the steam valve 225 to close and the water valve 230 to open, whereupon the previously steam-heated platens 201—202 of the press will commence to be cooled. Thus, the material loaded into the press platens which is to be molded thereby will be initially compressed and baked between the platens while in their heated condition, following which the platens will become cooled as the water from the conduit 222 reduces the temperature of the platens. The time control device 254 may be arranged to simultaneously supply compressed air into the conduit 236 for actuation of the valve 215 so as to divert the previous discharge from the platens through the steam trap into the water drain conduit 216. As the third step of the operational cycle of the system the press ram pilot control valve 250 may be arranged to close, thereby discontinuing hydraulic pressure against the ram 204 whereupon the press 200 will open.

As explained hereinabove, although only one of the possible structural forms and applications of the invention has been illustrated and described in detail hereinabove, the invention is not so limited and various changes may be made therein without departing from the spirit of the invention and the scope of the following claims.

What is claimed is:

1. In a time cycle controller including a pilot control device, a time control wheel, means operable to partially rotate said wheel intermittently at equal time intervals, a feeler device, means driving said feeler device to advance toward said wheel subsequent to each rotation of the latter and to retreat relative to said wheel prior to the next rotation thereof, said wheel having key means slidable thereon and adapted to be radially displaced thereon so as to present differently dimensioned abutment means thereon into registry with said feeler device whereby to limit the degree of advancement of said feeler device to either first or second positions of advancement, and control means operably connected to said feeler device for actuation of said pilot control device only upon advancement of said feeler device to said second position.

2. In a time cycle controller including a pilot control device, a time control member, means operable to progressively displace said control member intermittently at equal time intervals, a feeler device, means driving said feeler device to advance into bearing relation against said control member subsequent to each displacement of the latter and to then retreat relative to said control member prior to the next displacement thereof, said control member having key means thereon adapted to be positionally adjusted so as to regulate the extent of movements of said feeler device to either first or second positions of advancement when brought to bear against said control member, and means operably connected to said feeler device for actuation of said pilot control device only upon advancement of said feeler device to said second position.

3. In a time cycle controller, a time control member, means operable to progressively displace said member intermittently, a feeler device, means operable to drive said feeler device to advance into bearing relation against said control member subsequent to each displacement of the latter and to retreat relative to said control member prior to the next displacement thereof, said control member having means thereon positionally adjustable so as to regulate the degree of movement of said feeler device to either first or second positions of advancement when brought to bear against said control member, and control means operably connected to said feeler device for actuation only upon advancement of said feeler device to said second position.

4. In a multiple stage controller, a plurality of pilot control devices, each of said devices having a treadle movable relative thereto for selective actuation of said pilot devices, a cam shaft and a means for rotating the same, said cam shaft having groups of cams thereon in positional registry respectively with said treadles, each of said cam groups comprising a like series of cams mounted upon said cam shaft to have the operative camming portions of corresponding cams disposed at like progressively increased angles away from a zero or starting position thereon whereby upon progressive partial rotations of said cam shaft throughout increments of a complete revolution thereof corresponding of said cams of said cam groups will rise simultaneously relative to their corresponding treadles, and a key operably associated with each of said cams and adapted to be displaced between operative and inoperative positions relative to the cam and to the corresponding treadle, whereby to permit operator adjustment of said keys to procure selective operation of said treadles and consequent actuation of said pilot control devices in accord with a predetermined indexing program, and means for irregularly operating said cam shaft rotating means in accord with a preselected time interval program.

5. In a time cycle control device, a plurality of controlling actuators, an operating member associated with each of said actuators and separably operable to displace the latter, plural cam means in operative registry with each of said operating members, key devices for selectively rendering said operating members either operative or inoperative relative to each of said cam means, a motor operatively connected to said cam means for driving the latter, and a selective timing device controlling said motor automatically to drive said cam means at pre-selected time intervals through progressive increments of operation thereof.

6. In a time cycle control device, a plurality of pilot actuators, an operating member associated with each of said actuators, a plurality of pilot cams arranged at progressive cam shaft stage positions and in groups positionally corresponding to each of said operating members, a key associated with each of said cams for selectively rendering said operating members either operative or inoperative relative to said pilot cams, said pilot cams being mounted upon a common cam shaft, a motor operatively connected to said cam shaft for driving the latter, a selective timing device normally controlling said motor automatically to drive said cam shaft at preselected time intervals through progressive increments of rotation thereof, a cam shaft reset control switch adapted to control said motor to rotate said cam shaft independently of said selective timing device, a plurality of reset cams arranged on said cam shaft in stage correspondence to corresponding of said pilot cams, and a key associated with each of said reset cams and selectively adjustable to render corresponding of said reset cams operative or inoperative relative to said reset control switch.

7. In a time cycle controller including a pilot control device, a cam shaft having cam means thereon rotatable into pilot control device actuating position and into controller resetting position, a time control wheel having a ratchet thereon, a ratchet driver pawl and a ratchet locking pawl, an A. C. motor operable to actuate said driver pawl to rotate said time wheel intermittently at equal time intervals, a spring to reset said wheel when released by said ratchet pawls, a feeler device, means driving said feeler device to advance toward said wheel subsequent to each rotation of the latter and to retreat relative to said wheel prior to the next rotation thereof, said wheel having key means slidable thereon and adapted to be radially displaced thereon so as to present differently dimensioned abutment means thereon into registry with said feeler device whereby to limit the degree of advancement of said feeler device to either first or second positions of advancement, control means operably connected to said feeler device for actuation of said pilot control device only upon advancement of said feeler device to said second position, an A. C. power supply circuit for said motor, a rectifier, switch means for connecting said motor alternately to said A. C. supply and to said rectifier for locking the motor with the D. C. current output of said rectifier upon disconnection of the A. C. current supply thereto, means for automatically disconnecting said A. C. current supply from said motor only upon rotation of said cam shaft into controller resetting position coincident with retreat of said feeler, and means for retracting said pawls from said ratchet upon opening of said A. C. circuit and locking of said motor whereby to permit retrograde rotation of said time wheel to initial starting position under the influences of said spring.

8. In a time cycle controller including a pilot control device, a member movable between pilot control device actuating and controller resetting positions, a time control wheel having a ratchet thereon, a ratchet driver pawl and a ratchet locking pawl, a motor operable to actuate said driver pawl to rotate said time wheel intermittently at equal time intervals, a spring to reset said wheel when released by said ratchet pawls, a feeler device, means driving said feeler device to advance toward said wheel subsequent to each rotation of the latter and to retreat relative to said wheel prior to the next rotation thereof, said wheel having key means thereon adapted to be adjusted whereby to limit the degree of advancement of said feeler device to either first or second positions of advancement, control means operably connected to said feeler device for actuation of said pilot control device only upon advancement of said feeler device to said second position, a power supply means for said motor, a motor control system including means for deenergizing said motor upon coincidental attainment of a controller resetting position and a feeler retreated position, said motor control system including means for locking the motor upon deenergization thereof, and means for retracting said pawls from said ratchet upon deenerization and locking of said motor.

9. In a time cycle controller including a pilot control device, a time control wheel having a ratchet thereon, a ratchet driver pawl and a ratchet locking pawl, a motor operable to actuate said driver pawl to rotate said time wheel, a spring to reset said wheel when released by said ratchet pawls, a feeler device adapted to advance at different times to either first or second positions of advancement relative to said time wheel depending upon adjustment thereof, control means operably connected to said feeler device for actuation of said pilot control device only upon advancement of said feeler device to said second position, a power supply means for said motor and a braking means for said motor, means automatically operable to apply said braking means for locking the motor upon deenergization of said motor, and means for retracting said pawls from said ratchet upon deenergization and locking of said motor.

10. In a time cycle controller including a pilot control device, a time control wheel, a motor operable to rotate said time wheel, a spring to reset said wheel upon deenergization of said motor, a feeler device, means driving said feeler device to advance and retreat relative to said wheel, adjustable keys on said wheel movable to regulate the degree of advancement of said feeler device to either first or second positions of advancement, control means operably connected to said feeler device for actuation of said pilot control device only upon advancement of said feeler device to said second position, and a power supply means for said motor including switch means operable to deenergize said motor only when said feeler is in retreated position.

11. In a time cycle controller including a pilot control device, a rotatable cam shaft having cam means thereon adapted to be rotated progressively into pilot control device actuating positions and into controller resetting position, a time control wheel having a ratchet thereon, a ratchet driver pawl and a ratchet locking pawl, an A. C. motor operable to actuate said driver pawl to rotate said time wheel intermittently at equal time intervals, a spring to reset said wheel when released by said ratchet pawls, a feeler device, said wheel having adjustable means thereon adapted to cooperate with said feeler device to regulate operation thereof, motor means operably connected to said feeler device for control thereby and for actuation of said pilot control device only upon operation of said feeler device as regulated by said adjustable means, a power supply circuit for said motor, a motor brake device, switch means for alternately energizing said motor and said brake device, and means for retracting said pawls automatically from said ratchet upon deenergization of said motor whereby to permit retrograde rotation of said time wheel to initial starting position under the influences of said spring.

12. In a time cycle controller including a plurality of pilot control devices, a time control wheel having a ratchet thereon, a ratchet driver pawl and a ratchet locking pawl, a first motor operable to actuate said driver pawl to rotate said time wheel away from controller starting position, a spring to reset said wheel to starting position when released by said ratchet pawls, a feeler device adapted to move to advanced position when permitted by adjustments on said time control wheel, a cam shaft, a second motor operably connected to said feeler device to be controlled thereby for actuation of said cam shaft to successively new index positions only upon such advancement of said feeler device, a braking means for said first motor, means automatically operable to apply said braking means for locking said first motor upon deenergization thereof, means for retracting said pawls from said ratchet upon deenergization and locking of said first motor, a treadle associated with each of said pilot control devices and movable to actuate the latter, a reset switch operable to cause deenergization of said first motor to initiate resetting of said time wheel to its starting position, a treadle associated with said reset switch, said cam shaft having groups of cams thereon in positional registry respectively with said treadles, each of said cam groups comprising a like series of cams mounted upon said cam shaft to have the operative camming portions of corresponding cams disposed at like progressively increased angles away from the cam shaft starting position thereon whereby upon progressive partial rotations of said cam shaft throughout increments of a complete revolution thereof corresponding of said cams of said cam groups will rise simultaneously relative to their corresponding treadles, and a key operably associated with each of said cams and adapted to be displaced between operative and inoperative positions relative to the cam and to the corresponding treadle, whereby to permit operator adjustment of said keys to procure selective operation of said treadles and consequent actuation of said pilot control devices and resetting of the controller in accord with a predetermined indexing program.

13. In a time cycle control device, a plurality of controlling actuators, pluralities of operating members associated with each of said actuators and separably operable to displace the latter, cam means in operative registry with said operating members, control devices for selectively rendering said operating members either operative or inoperative relative to said cam means, a motor operatively connected to said cam means for driving the latter, and a selective timing device controlling said motor automatically to drive said cam means at pre-selected time intervals through progressive increments of operation thereof.

EUGENE B. SUTHERLAND.

REFERENCES CITED

The following references are of record in the file of this patent:

UNITED STATES PATENTS

| Number | Name | Date |
| --- | --- | --- |
| 398,623 | Keeton | Feb. 26, 1889 |
| 1,830,553 | Love | Nov. 3, 1931 |
| 1,853,714 | Allen | Apr. 12, 1932 |
| 1,913,184 | Zubaty | June 6, 1933 |
| 2,256,466 | Callin | Sept. 23, 1941 |
| 2,269,856 | Nelson et al. | Jan. 13, 1942 |
| 2,281,262 | Breitenstein | Apr. 28, 1942 |
| 2,301,556 | Mavis | Nov. 10, 1942 |
| 2,359,059 | Somes | Sept. 26, 1944 |